May 28, 1935.　　　　B. MAYER　　　　2,002,824
ROLL FILM CAMERA
Filed Jan. 5, 1935
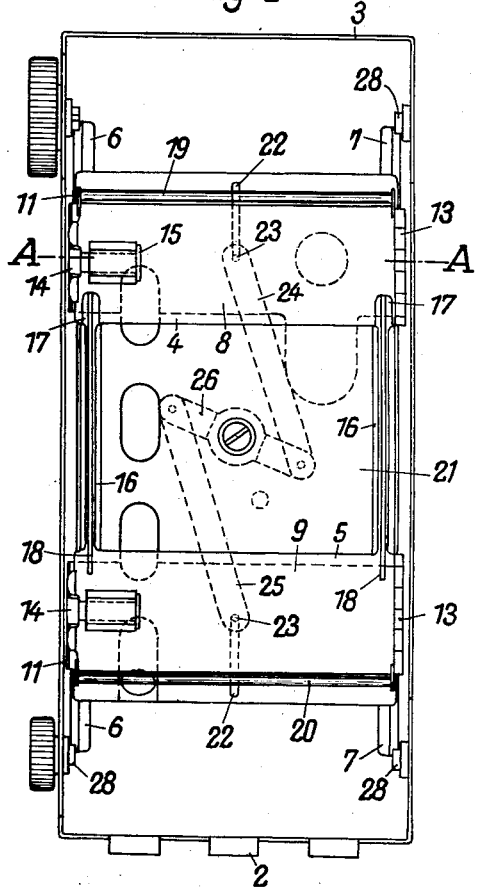
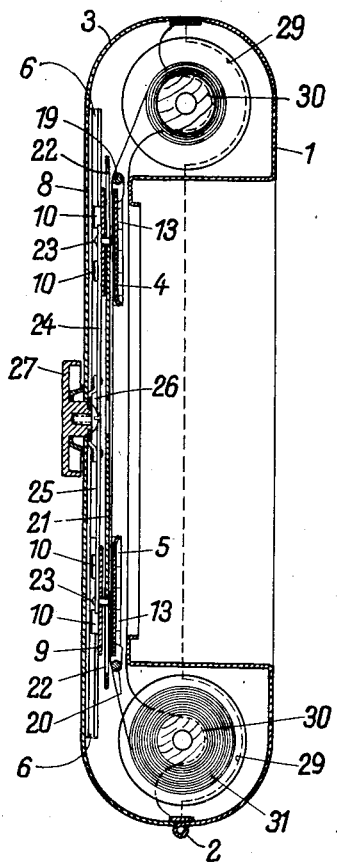
Inventor:
B. Mayer
By: Glascock Downing & Seebold
Attys.

Patented May 28, 1935

2,002,824

UNITED STATES PATENT OFFICE 2,002,824

ROLL FILM CAMERA

Bruno Mayer, Nuremberg, Germany

Application January 5, 1935, Serial No. 559
In Germany November 19, 1932

5 Claims. (Cl. 95—32)

This invention relates to a roll film camera, with two oppositely moving masking screens adjustable from outside the camera. Roll film carriers in which, for the purpose of diminishing the size of the picture, two blinds are provided which are slidable in opposite directions from the side towards the middle, are already known. Such blinds have however the disadvantage that they stretch and become slack in the course of time, so that the free aperture becomes displaced or distorted, thereby yielding a picture of incorrect dimensions.

In another known roll film camera the screens that determine the size of the picture consist of rigid cover slides, which are slidably displaced in opposite directions by means of two toothed racks arranged parallel to one another on one side wall of the camera, with a toothed pinion meshing with the said racks. This device involves a greater depth of the camera casing, since room has to be provided for the two racks and the pinion. The space available on the side walls is for the most part required by the struts and stays. Furthermore the toothed rack gearing requires special transmission means, since the pinion has to be as small as possible on structural grounds, if the movement of the rack is to be reduced to one revolution of the operating knob.

According to the invention these disadvantages are obviated by the fact that the boundary screens, constructed as slides, are fitted to the camera cover, and are displaceable by means of a double crank gear, likewise arranged on the camera cover. Such a camera is not appreciably larger than a roll film camera without limiting screens.

A further feature of the invention consists in the fact that the sliding screens are hingedly connected with the walls beneath them and that the film spools are mounted on the camera cover. The insertion of the film can therefore be effected more easily than if the slidable cover screens, fitted to the camera cover, are rigidly connected with their second walls, so that the strip of film has to be drawn through between the cover screens and the second walls.

In order to enable the film to be flattened and pressed against the picture window formed by the cover walls a pressing plate is provided between the sliding screens and the second walls. One form of construction of the invention is illustrated by way of example in the accompanying drawing, in which Figure 1 shows the camera cover as seen from inside, Figure 2 shows a longitudinal section through the camera casing, with cover, and Figure 3 shows a section through the camera cover on the line A—A in Fig. 1.

To the camera casing 1 is pivoted by means of a hinge 2 a cover 3, on which are guided upper cover walls 4 and 5 for the purpose of varying the size of the picture. For the guidance thereof there are soldered on to the inner cover wall two U-shaped rails 6 and 7, as shown in Figure 3, in the fold of which lower cover walls 8 and 9 are slidably arranged by means of lugs 10 stamped and bent out of them. Each wall 8, 9 is bent up along both its ends to form marginal brims 11, 12. The marginal brim 12 is rolled in to form a hinge 13, to which the upper cover wall 4, 5 is rockably pivoted, so that the film can easily be inserted without difficulty. The other marginal brim 11 has a projecting lug 14, under which a locking bolt 15 provided on each of the cover walls 4, 5 can be slid.

The two upper cover walls 4 and 5 have two lateral sheet metal rails 16 and 17 slidable one in the other, and thereby form a frame, the window aperture of which can be varied to correspond to the adjustable size of picture surface. The two sheet metal rails 16 connected with the cover wall 4 embrace the other two sheet metal rails 17 of the cover wall 5, which are slidable in them, and which are provided for stiffening purposes with a central longitudinal groove or indentation. In order to protect the strip of film against being scratched as it moves past the window aperture, there are mounted on the cover walls 4 and 5 the roller bars 19 and 20, which in other cameras are usually mounted on the camera casing.

Between the cover walls 4 and 5 and the walls 8 and 9 below them there is a plate 21, which extends over the image window, and which enables the film to be pressed flat. The pressing plate 21 is provided on both its ends with slots 22, in which is guided a rivet 23, which holds the plate 21 on the walls 8 and 9, and which at the same time connects the walls 8 and 9, and therefore also the cover walls 4 and 5, with the rods 24 and 25 of the double crank gear. By the double crank gear the walls 4, 5 and 8, 9 are slid to and fro. For this purpose the rods 24 and 25 are connected with a two-armed lever 26, which is mounted on the cover 3, upon the hub (Fig. 2) of a rotatable knob 27, located on the outside of the camera cover.

The film spools are not supported in the usual way on the camera casing 1 but on the cover 2. The side walls of the cover exhibit for this purpose at the bearing positions 28 for the film spools eyes 29 (Fig. 2) projecting like lugs, while in the side walls of the camera casing 1 are provided recesses or apertures 30 for the bearing pivots 28 on the cover. The insertion of a film is thereby made just as simple as in the case of an ordinary roll film camera.

When a film spool is to be inserted in the camera the cover walls 4, 5 are first adjusted to the small size of picture, and they are then rocked up, after sliding back the locking bars 15, about the hinges 13. The strip of paper is now unwound from the film spool 31, inserted on the cover between the bearing pivots 28, laid over the pressing plate 21, and wound on to the empty spool. The cover walls 4, 5 are then rocked back again, and the locking bars 15 are slid forward, so that the strips of paper and film lie between the pressing plate 21 and the cover walls adjustable by means of the crank gearing. In Figure 3 the strips of film and paper are not shown.

The altering of the size of picture surface is effected by rotating the knob 27, the lever 26 shifting by means of the rods 24 and 25 the lower cover walls 8 and 9 and the upper cover walls 4 and 5 connected therewith. For the pressing plate 21 held by the two rivets 23 on the walls 8 and 9, this shifting is without influence, since the rivets 23 are guided in the slots 22.

What I claim is:—

1. A roll film camera, comprising a camera cover, two masking screens fitted to the camera cover and slidable in opposite directions to vary the area of film exposed in taking a photograph, a double crank mechanism, likewise arranged on the camera cover, for displacing the masking screens, and means for actuating the double crank mechanism from outside the camera.

2. A roll film camera, comprising a camera cover, two walls, two masking screens fitted to the camera cover and connected to the two walls, the masking screens being slidable in opposite directions to vary the area of film exposed in taking a photograph, a rotatable double crank, flat strips pivoted at one end to the ends of the double crank and at their other ends to the said two walls, and a knob rotatable from outside the camera for actuating the double crank.

3. A roll film camera, comprising a camera cover, film spools mounted on the camera cover, two walls, two masking screens fitted to the camera cover and hingedly connected to the two walls, the masking screens being slidable in opposite directions to vary the area of film exposed in taking a photograph, a double crank mechanism, likewise arranged on the camera cover, for displacing the masking screens, and means for actuating the double crank mechanism from outside the camera.

4. A roll film camera, comprising a camera cover, two walls, two masking screens fitted to the camera cover, the masking screens being slidable in opposite directions, to vary the area of film exposed in taking a photograph, a rotatable double crank, connecting rods each pivoted by one end to one end of the double crank, pivot pins secured in the two walls and connected with the other ends of the connecting rods, a knob rotatable from outside the camera for actuating the double crank, and a pressing plate between the masking screens and the two walls, this pressing plate being guided on the said pivot pins.

5. A roll film camera, comprising a camera cover, two walls, two masking screens fitted to the camera cover and connected to the two walls, the masking screens being slidable in opposite directions to vary the area of film exposed in taking a photograph, a double crank mechanism, likewise arranged on the camera cover, for displacing the masking screens, means for actuating the double crank mechanism from outside the camera, both ends of both the walls being bent up to form marginal brims, one marginal brim of each wall being hingedly connected with the masking screens, projecting lugs on the other marginal brims, and locking bars secured to the masking screens and adapted to engage under the said lugs.

BRUNO MAYER.